United States Patent [19]

Miyoshi et al.

[11] Patent Number: 4,598,014

[45] Date of Patent: Jul. 1, 1986

[54] MAGNETIC RECORDING MEDIUM

[75] Inventors: Takahito Miyoshi; Kenichi Masuyama; Toshimitu Okutu; Masahiro Utumi; Masaaki Fujiyama; Minoru Kanazawa, all of Kanagawa, Japan

[73] Assignee: Fuji Photo Film Co., Ltd., Kanagawa, Japan

[21] Appl. No.: 672,322

[22] Filed: Nov. 16, 1984

[30] Foreign Application Priority Data

Nov. 16, 1983 [JP] Japan ................. 58-215812

[51] Int. Cl.$^4$ ............................. G11B 5/72
[52] U.S. Cl. ................... 428/323; 360/134; 360/135; 360/136; 427/128; 427/131; 428/329; 428/330; 428/408; 428/694; 428/900
[58] Field of Search ............ 428/694, 695, 463, 407, 428/408, 900, 323, 329, 330; 427/44, 130, 131, 128; 252/62.54; 360/134–136

[56] References Cited

U.S. PATENT DOCUMENTS

| | | | |
|---|---|---|---|
| 4,135,031 | 1/1979 | Akashi | 428/694 |
| 4,310,599 | 1/1982 | Akashi | 428/694 |
| 4,414,270 | 11/1983 | Miyoshi | 428/694 |
| 4,419,406 | 12/1983 | Isobe | 428/694 |
| 4,451,531 | 5/1984 | Isobe | 428/694 |
| 4,452,863 | 6/1984 | Takizawa | 428/694 |
| 4,474,843 | 10/1984 | Miyoshi | 428/694 |

FOREIGN PATENT DOCUMENTS

| | | | |
|---|---|---|---|
| 9041 | 4/1979 | Japan . | |
| 2413 | 1/1983 | Japan | 427/131 |

*Primary Examiner*—Ellis P. Robinson
*Attorney, Agent, or Firm*—Sughrue, Mion, Zinn, Macpeak, and Seas

[57] ABSTRACT

A magnetic recording medium is disclosed. The medium comprises a non-magnetic support having provided on opposite surfaces a magnetic recording layer and a backing layer containing two types of carbon black and a binder and having a thickness of 2 μm or less, one of said carbon black being fine carbon black having an average particle size of 30 to 100 mμ and the other of said carbon black being coarse carbon black having an average particle size of 150 to 500 mμ, and the mixing weight ratio of said carbon black and the binder being 1:1.5 to 1:3.5.

13 Claims, No Drawings

MAGNETIC RECORDING MEDIUM

FIELD OF THE INVENTION

The present invention relates to a magnetic recording medium, and more particularly it relates to a magnetic recording medium having excellent electromanetic properties, a low friction coefficient, firm adhesion of a backing layer and excellent running durability.

BACKGROUND OF THE INVENTION

A magnetic recording medium used for high density recording such as audio recording, video recording or computers has recently been required. The surface of a magnetic layer is made smooth to improve the sensitivity (particularly the output in a high frequency region) of the magnetic recording medium, and a magnetic tape is made thinner, for example, 20 μm or less. Further, a backing layer is a thin film and is readily worn. In addition, the strength of a whole tape is decreased because the tape is made thin, thereby affecting the running durability, the winding up property, drop out and output fluctuation.

When a magnetic tape with or without a backing layer is repeatedly run for several tens of times, color demagnetization often taken place particularly in a video tape.

SUMMARY OF THE INVENTION

An object of the present invention is to provide a magnetic recording medium whose friction coefficient is not increased after repeated use, which is not readily worn, which has excellent adhesion of the backing layer and which has excellent running durability after repeated use.

Another object of the present invention is to provide a magnetic recording medium having a backing layer which is suitable for both conventional coated type tapes and thin metal film type magnetic tapes without deteriorating the S/N characteristics of a magnetic layer.

As a result of thorough investigation as to a structure of a backing layer to solve the above problems, it has been found in the present invention that a magnetic recording medium can remarkably be improved by using a backing layer having a thickness of 2 μm or less, preferably 0.3 to 2.0 μm and more preferably 0.5 to 1.3 μm, which contains two kinds of carbon black having predetermined particle sizes and having a certain mixing ratio.

DETAILED DESCRIPTION OF THE INVENTION

As set forth above, these objects can be achieved by a magnetic recording medium comprising a non-magnetic support having provided on opposite surfaces (1) a magnetic recording layer and (2) a backing layer containing two kinds of carbon black and a binder and having a thickness of 2 μm or less, wherein one of the carbon black has an average fine particle size of 30 to 100 mμ, preferably 40 to 60 μm, and the other has an average coarse particle size of 150 to 500 m μ, preferably 200 to 300 mμ, and the mixing weight ratio of total carbon black and binder is 1:0.5 to 1:3.5.

Carbon black having a particle size of 30 to 100 mμ used in the present invention is very advantageous for VHS type video tapes because electric resistance on a surface of a backing layer can be made lower and percent transmission of light can be also made lower.

Carbon black having a particle size of 150 to 500 mμ used in the present invention not only functions as a solid lubricating agent, but also serves to provide appropriate surface condition of the backing layer when it is used in combination with carbon black having a particle size of 30 to 100 mμ.

In the present invention, a lubricating agent which is transferred from a magnetic layer or which is overcoated on or added to a magnetic layer can be maintained and unevenness of a surface can fall within an allowable range and, therefore, the running durability is remarkably improved. Additionally, adhesion of the backing layer is very excellent when the backing layer contains carbon black having two particle sizes in combination.

The mixing ratio of fine carbon black having a particle size of 30 to 100 mμ and coarse one having a particle size of 150 to 500 mμ is preferably 99.5:0.5 to 50:50, more preferably 99:1 to 60:40, by weight.

It is preferred that a backing layer of the present invention has a smooth surface having a center line average roughness Ra of 0.01 to 0.03 μm, more preferably 0.01 to 0.024 μm, at a cut off value of 0.08 mm.

Generally, unevenness of a conventional backing layer is transferred onto a magnetic recording layer. However, by the use of a backing layer having a smooth surface, such transfer can be prevented.

It is believed that by the use of fine carbon black having a particle size of 30 to 100 mμ and coarse carbon black having a particle size of 150 to 500 mμ which is well dispersed and coated on a backing layer, a continuous surface having a surface unevenness of an adequate wave length can be formed, and it helps a capstan to touch softly and to not generate color demagnetization.

The average particle size of carbon black used in the present invention was measured by taking a picture of whole carbon black by an electron microscope and counting the number of whole carbon black particles by a particle analyzer.

A binder used in the backing layer of the present invention includes binders which are known to one skilled in the art such as a thermoplastic resin, a thermosetting resin, a reactive type resin or a mixture thereof. The binders can be selected from those shown below. It is preferred that at least one binder has a glass transition temperature Tg of 40° C. or more, particularly a Tg of 60° C. or more.

Thermoplastic resins which can be used include a copolymer of vinyl chloride-vinyl acetate, a copolymer of vinyl chloride-vinylidene chloride, a copolymer of vinyl chloride-acrylonitrile, a copolymer of acrylate-acrylonitrile, a copolymer of acrylate-vinylidene chloride, a copolymer of acrylate-styrene, a copolymer of methacrylate-acrylonitrile, a copolymer of methacrylate-vinylidene chloride, a copolymer of methacrylate-styrene, a urethane elastomer, polyvinyl fluoride, a copolymer of vinylidene chloride-acrylonitrile, a copolymer of butadiene-acrylonitrile, a polyamide resin, a polyvinyl butyral, a cellulose type resin (cellulose acetate butyrate, cellulose diacetate, cellulose propionate, nitrocellulose and the like), a copolymer of styrene-butadiene, a polyester resin, a copolymer of chlorovinyl ether-acrylate, an amino resin, and various rubber type resins. Preferred examples of thermoplastic resins include a copolymer of vinyl chloride-vinylidene chloride, a copolymer of vinyl chloride-vinyl acetate, a cellulose type resin and a urethane elastomer.

Thermosetting resins or reactive type resins which can be used include a phenol resin, an epoxy resin, a curable polyurethane resin, a urea resin, a melamine resin, an alkyd resin, an acryl type reactive resin, a polyisocyanate and polyamine. Preferred examples of reaction type thermosetting resins include a polyisocyanate and an epoxy resin.

The mixing weight ratio of carbon black and a binder used in the backing layer of the present invention is 1:0.5 to 1:3.5, more preferably 1:0.8 to 1:3.0.

When the carbon black is included in an amount more than the above mixing ratio, the carbon black readily drops off. When carbon black is included in an amount less than the above mixing ratio, the friction coefficient increases after repeated use.

A lubricating agent which is used in a conventional magnetic tape can be kneaded into or overcoated on the backing layer of the present invention. When a fatty acid or a fatty acid ester having 12 or more carbon atoms is used as the lubricating agent and contained in the backing layer, the running properties can be additionally improved. Typical examples of fatty acids and esters thereof are lauric acid, myristic acid, palmitic acid, stearic acid, arachic acid, behenic acid, oleic acid, erucic acid, linolic acid, linolenic acid, and ethyl or butyl esters of these acids. The lubricating agent can be used in an amount of 0.1 to 10 parts by weight, preferably 0.2 to 5 parts by weight, per 100 parts by weight of carbon black.

A ferromagnetic layer used in the present invention can be (1) a layer containing Co-containing magnetic iron oxide, particularly fine iron oxide having an $S_{BET}$ of 33 m$^2$/g or more, ferromagnetic metal particles, a hexagonal crystal type ferrite magnetic particles such as barium ferrite or (2) a thin ferromagnetic metal film prepared by a vapor deposition such as vacuum deposition, sputtering or ion plating.

Materials and methods used for preparing the magnetic recording medium of the present invention are disclosed in U.S. Pat. No. 4,135,016.

The present invention is explained in more detail by the following non-limiting Examples wherein all parts are by weight. An average (number average) particle size of carbon black used in the present invention was determined by taking a picture of whole carbon black used in the present invention by an electron microscope and counting the number of carbon black particles from the picture by a particle analyzer.

EXAMPLE 1

On opposite surfaces of a polyethylene terephthalate base having a thickness of 14 μm were provided a magnetic layer containing Co-containing magnetic iron oxide having a specific surface area $S_{BET}$ of 38 m$^2$/g and a backing layer having a thickness of 1 μm. The magnetic layer and the backing layer were coated using the following coating compositions. An average particle size and the additive amount of carbon black of the backing layer are shown in Table below.

The resulting samples were identified as Nos. 1 to 10.

| Coating Composition for the Magnetic Layer | |
|---|---|
| Co-containing Magnetic Iron Oxide ($S_{BET}$ 38 m$^2$/g) | 100 parts |
| Nitrocellulose | 10 parts |
| Polyurethane Resin ("Nipporan 2304", a trade name of Nippon Polyurethane Co., Ltd.) | 6 parts |
| Polyisocyanate | 10 parts |
| Cr$_2$O$_3$ | 2 parts |
| Oleic Acid | 1 part |
| Butyl Stearate | 1 part |
| Myristic Acid | 1 part |
| Methyl Ethyl Ketone | 300 parts |
| Coating Composition for the Backing Layer | |
| Nitrocellulose | 20 parts |
| Polyurethane Resin ("Nipporan 2304", a trade name) | 10 parts |
| Polyisocyanate | 10 parts |
| Cr$_2$O$_3$ | 0.5 part |
| Stearic Acid | 0.5 part |
| Oleic Acid | 0.5 part |
| Carbon Black | Amounts shown in Table |
| Methyl Ethyl Ketone | 600 parts |

EXAMPLE 2

On opposite surfaces of a polyethylene terephthalate film having a thickness of 12 μm were provided by the oblique incidence vapor deposition method a Co-Ni (Ni: 20 wt %) magnetic layer having a thickness of 0.15 μm and a backing layer which was the same as that in Example 1. The thus obtained samples were identified as Nos. 11 to 15.

All of the samples were tested in the following manner and the results are shown in Table below.

Evaluation:

(1) Adhesion of the Backing Layer:

A mending tape manufactured by Nichiban Co., Ltd. was adhered on the backing layer of samples which had been slit into a width of ½ inch and the magnetic tape sample was rapidly peeled off at an angle of 180°. The adhered area was ½ inch × 1 inch, which was assumed to be 100%. The area of the backing layer which was stripped away from the support was shown in terms of percent.

(2) Demagnetization of the Tape After 100 Passes:

A sample tape was repeatedly run for 100 times using a VHS type VTR "NV-8300", a trade name, manufactured by Matsushita Electric Industries Co., Ltd. Then, the reproduced image was visually observed and the number of streaks of color demagnetization of appearance on monitor was counted.

This test was done only with Sample Nos. 1 to 7.

TABLE

| Sample Number | Additive Amount of Carbon Black (part) | | | | Mixing Ratio of Carbon/Binder | Firm Adhesion of Backing Layer Stripped Area (%) | Demagnetization After 100 Passes (number of streaks of Color Demagnetization of Appearance) |
|---|---|---|---|---|---|---|---|
| | Particle Size 20 mμ | Particle Size 50 mμ | Particle Size 120 mμ | Particle Size 250 mμ | | | |
| 1 | 18 | | | 2 | 1/2 | 20 | 15 |
| 2 | | 18 | | 2 | 1/2 | 30 | 15 |
| 3 | 20 | | | | 1/2 | 10 | 15 |
| 4 | 19.95 | | | 0.05 | 1/2 | 10 | 10 |

TABLE-continued

| Sample Number | Additive Amount of Carbon Black (part) | | | | Mixing Ratio of Carbon/Binder | Firm Adhesion of Backing Layer Stripped Area (%) | Demagnetization After 100 Passes (number of streaks of Color Demagnetization of Appearance) |
| --- | --- | --- | --- | --- | --- | --- | --- |
| | Particle Size 20 mμ | Particle Size 50 mμ | Particle Size 120 mμ | Particle Size 250 mμ | | | |
| 5 | | 19.85 | | 0.15 | 1/2 | 5 | 3 |
| 6 | | 18 | | 2 | 1/2 | 0 | 0 |
| 7 | | 11 | | 9 | 1/2 | 5 | 3 |
| 8 | | 9 | | 11 | 1/2 | 10 | 10 |
| 9 | | 90 | | 10 | 1/0.4 | 50 | 20 |
| 10 | | 9 | | 1 | 1/4 | 50 | 5 |
| 11 | | 16 | | | 1/2.5 | 10 | |
| 12 | | 15 | 1 | | 1/2.5 | 0 | |
| 13 | | 93.75 | | 6.25 | 1/0.4 | 50 | |
| 14 | | 9.4 | | 0.6 | 1/4 | 50 | |
| 15 | | 7.2 | | 0.8 | 1/2.5 | 10 | |

It is clear from the results shown in Table 1 that the backing layer exhibited excellent result when the backing layer used the combination of fine carbon black having a particle size of 30 to 100 mμ and coarse one having a particle size of 150 to 500 mμ and the mixing ratio of carbon black/binder was within a range of 1/0.5 to 1/3.5.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support having provided on opposite surfaces a magnetic recording layer and a backing layer containing two types of carbon black and a binder and having a thickness of 2 μm or less, one of said carbon black being fine carbon black having an average particle size of 30 to 100 mμ and the other of said carbon black being coarse carbon black having an average particle size of 150 to 500 mμ, and the mixing weight ratio of said carbon black and the binder being 1:0.5 to 1:3.5.

2. The magnetic recording medium as claimed in claim 1, wherein said backing layer has a center line average roughness Ra of 0.01 to 0.03 μm at a cut off value of 0.08 mm.

3. The magnetic recording medium as claimed in claim 1, wherein said fine carbon black and said coarse carbon black have a mixing ratio of 99.5:0.5 to 50:50.

4. The magnetic recording medium as claimed in claim 3, wherein said fine carbon black and said coarse carbon black have a mixing ratio of 99:1 to 60:40.

5. The magnetic recording medium as claimed in claim 1, wherein said binder is selected from the group consisting of a thermoplastic resin, a thermosetting resin, a reactive type resin and mixtures thereof.

6. The magnetic recording medium as claimed in claim 1, wherein said binder has a glass transition temperature of 40° C. or more.

7. The magnetic recording medium as claimed in claim 6, wherein said binder has a glass transition temperature of 60° C. or more.

8. The magnetic recording medium as claimed in claim 1, wherein said mixing weight ratio of carbon black and binder is 1:0.8 to 1:3.0.

9. The magnetic recording medium as claimed in claim 1, wherein said backing layer further comprises as a lubricating agent, a fatty acid or a fatty acid ester having 12 or more carbon atoms.

10. The magnetic recording medium as claimed in claim 1, wherein said magnetic recording layer contains Co-containing magnetic iron oxide having an $S_{BET}$ of 33 m²/g or more, ferromagnetic metal particles or hexagonal crystal type ferrite magnetic particles.

11. The magnetic recording medium as claimed in claim 1, wherein said magnetic recording layer is a thin ferromagnetic metal film.

12. The magnetic recording medium as claimed in claim 1, wherein said backing layer has a thickness in the range of from 0.3 to 2.0 μm.

13. The magnetic recording medium as claimed in claim 3, wherein said backing layer has a thickness in the range of from 0.3 to 2.0 μm.

* * * * *